Patented Aug. 29, 1939

2,171,244

UNITED STATES PATENT OFFICE 2,171,244

FOOD COMPOUND

Theodore J. Otterbacher, Zion City, Ill., assignor, by mesne assignments, to Corn Products Refining Company, New York, N. Y., a corporation of New Jersey No Drawing. Application March 26, 1937, Serial No. 133,186

14 Claims. (Cl. 99—134)

This invention relates to food compositions and the principal object of the invention is to produce a light, creamy, beaten or aerated compound having some of the characteristics of a fondant but being lighter than fondants and some of the characteristics of marshmallow but being considerably heavier and denser than marshmallow. The product is suitable as a center for cookies and confections, or as an icing or filling for cakes, and the like, or it may be used, preferably with the addition of a fat, as a sandwich or sugar-wafer filling.

The compound is made without cooking and consists essentially of a syrup in which dextrose hydrate is insoluble, or but slightly soluble (the term insoluble being intended to cover slight solubility), an edible colloid having beating properties, that is which gives the compound an aerated condition when beaten, and previously crystallized, that is to say commercial dextrose hydrate in finely divided form which is beaten into and dispersed through the syrup.

The compound may also contain, as optional ingredients, coloring matters, flavors, chocolate, cocoa or substances to give the compound the desired appearance and taste effects.

The compound as above described may be modified, for use particularly as a wafer or sandwich filling, by the introduction of a fatty substance such as butter, lard, hydrogenated fat, and the like.

The composition of the syrup may be considerably varied. It may contain sucrose, corn syrup, invert syrup, dextrose, or some of these ingredients, in varying proportions, provided that the composition is such that dextrose hydrate is insoluble or but slightly soluble therein.

The preferred edible colloid is gelatin, but in place of this may be used egg albumin, or whey protein, and, less desirably, agar-agar. In fact it is possible to use any edible and tasteless colloid which has "beating properties", by which is intended that when the substance is added to the syrup the mixture may be beaten up to have, through incorporation of air, a light and creamy consistency.

The following are exemplifications of the invention, which, it will be understood, are merely typical and informative and are not intended to limit the invention to the particulars specified; the intention being to cover all equivalents as well as all modifications within the scope of the appended claims.

*Example 1.*—A syrup is made by dissolving together the following ingredients by weight:

| | Per cent |
|---|---|
| Sucrose | 3.82 |
| Corn syrup | 10.25 |
| Invert sugar | 9.15 |
| Dextrose | 3.82 |
| Water | 5.13 | to this is added

| | |
|---|---|
| Gelatin | 0.65 |
| Water to dissolve gelatin | 1.96 |
| Finely divided dextrose hydrate | 65.22 |
| Total | 100.00 |

The dissolved gelatin and syrup are placed in a beater and the mixture beaten until a soft, marshmallow-like substance is produced. The beating may require 5 to 7 minutes. After this the dextrose hydrate is added and the mixture beaten, say for 1 minute, to thoroughly mix the sugar with the beaten syrup and gelatin mixture.

*Example 2.*—The syrup in this case is composed preferably of the same ingredients and in the same proportions as in Example 1. A certain amount of hydrogenated fat is added and the percentages of syrup and dextrose hydrate are reduced; the formula being preferably substantially as follows:

| | Per cent |
|---|---|
| Syrup | 30.21 |
| Gelatin | 0.60 |
| Water to dissolve gelatin | 1.71 |
| Dextrose hydrate | 60.41 |
| Completely hydrogenated fats | 7.07 |
| Total | 100.00 |

The method of making is the same as in Example 1 except that there is beaten into the mixture, with the dextrose hydrate, the specified quantity of hydrogenated fat.

It will be seen from the above examples that the invention is characterized by the fact that finely divided commercial, that is previously prepared, dextrose hydrate is added to a syrup in which it is insoluble and is uniformly mixed with such syrup. Under these conditions the dextrose hydrate remains substantially unchanged in the finished product and the product is thus differentiated from products in which dextrose has crystallized from the syrup. The form of the crystals, it may be added, where crystallization takes place in situ, is quite different from the form of the crystals in previously prepared, or commercial, dextrose, added to the syrup in accordance with the present invention; and such difference is appreciable in, and characteristic of, the product of the invention, differentiating it from prior known products. By the words "previously prepared" as used in the claims, is intended a dextrose prepared in a crystalline form and introduced into the syrup in distinction to dextrose crystallized out of the syrup. By commercial dextrose hydrate is meant the only commercial dextrose hydrate now known to the art, namely, the dextrose hydrate described and claimed in United States patent to Newkirk, 1,508,569, September 16, 1924, the method of manufacturing the same being more fully described in United States patents to Newkirk No. 1,471,347, October 23, 1923, and No. 1,521,830, January 6, 1925. This product consists of a mass of separate, unitary crystals of normal crystalline form substantially unmixed with deformed crystals of the needle like or flake like kind.

I claim:

1. Process of making food compounds of the character herein described which comprises: Forming a syrup in which dextrose is insoluble; adding an edible colloid having beating properties and beating the mixture; then adding and beating into the mixture finely divided dextrose hydrate the finely divided dextrose hydrate being added and beaten into the mixture under conditions such that the crystals will remain substantially unchanged in the product.

2. Process of making food compounds of the character herein described which comprises: Forming a syrup in which dextrose is insoluble; adding an edible colloid having beating properties and beating the mixture; then adding and beating into the mixture finely divided dextrose hydrate and a fatty substance the finely divided dextrose hydrate being added and beaten into the mixture under conditions such that the crystals will remain substantially unchanged in the product.

3. Process of making food compounds of the character herein described which comprises, forming a syrup in which dextrose is insoluble, then, after the syrup is fully prepared, adding an edible colloid having beating properties, and then adding and beating into the mixture a substantial quantity of finely divided, previously prepared dextrose hydrate under conditions such that the dextrose hydrate will remain substantially unchanged in the product.

4. Process of making food compounds of the character herein described which comprises, forming a syrup in which dextrose is insoluble, then, after the syrup is fully prepared, adding an edible colloid having beating properties, and then adding and beating into the mixture substantially 60% of finely divided, previously prepared dextrose hydrate under conditions such that the dextrose hydrate will remain substantially unchanged in the product.

5. Process of making a food compound which comprises mixing sucrose, corn syrup, invert sugar, dextrose and water to provide a syrup in which dextrose hydrate is substantially insoluble, then adding and beating into the syrup thus produced an edible colloid having beating properties and a finely divided dextrose hydrate, the syrup phase comprising substantially 30% and the finely divided dextrose comprising substantially 60% of the compound.

6. Process of making food compound of the character herein described which comprises, forming a syrup in which dextrose is insoluble, adding an edible colloid having beating properties, then adding and beating into the mixture finely divided dextrose hydrate under conditions such that there will be no appreciable induction of new crystals and the finely divided dextrose hydrate will remain substantially unchanged in the product.

7. A beaten or aerated uncooked food compound containing a syrup in which dextrose is insoluble; substantially unchanged dextrose hydrate previously ground to a finely divided state; and an edible colloid having beating properties.

8. A beaten or aerated uncooked food compound containing a syrup in which dextrose is insoluble; substantially unchanged dextrose hydrate previously ground to a finely divided state; and gelatin.

9. A beaten or aerated uncooked food compound containing a syrup in which dextrose is insoluble; substantially unchanged dextrose hydrate previously ground to a finely divided state; an edible colloid having beating properties; and a fat.

10. A beaten or aerated uncooked food compound containing a syrup in which dextrose is insoluble; substantially unchanged dextrose hydrate previously ground to a finely divided state; gelatin; and a fat.

11. A beaten or aerated uncooked food compound containing: a syrup composed of sucrose, corn syrup, invert sugar, dextrose and water, in which syrup dextrose hydrate is insoluble; gelatin; and substantially unchanged dextrose hydrate previously ground to a finely divided state.

12. A beaten or aerated uncooked food compound containing the following ingredients by weight approximately as follows: a syrup composed of sucrose 3.82%, corn syrup 10.25%, invert sugar 9.15%, dextrose 3.82%, water 5.13%; gelatin 0.65% dissolved in water 1.96%; and substantially unchanged dextrose hydrate previously ground to a finely divided state 65.22%.

13. A beaten or aerated uncooked food compound containing: syrup composed of sucrose 3.82%, corn syrup 10.25%, invert sugar 9.15%, dextrose 3.82%, and water 5.13%; gelatin 0.60% dissolved in water 1.71%; substantially unchanged dextrose hydrate previously ground to a finely divided state 58.45%, and hydrogenated fat 7.07%.

14. A beaten or aerated uncooked food compound containing: a syrup composed of sucrose, corn syrup, invert sugar, dextrose, and water, in which syrup dextrose hydrate is insoluble; gelatin; substantially unchanged dextrose hydrate previously ground to a finely divided state; and a fatty substance.

THEODORE J. OTTERBACHER.